(12) United States Patent
Emens et al.

(10) Patent No.: US 6,487,553 B1
(45) Date of Patent: Nov. 26, 2002

(54) METHOD FOR REDUCING SEARCH RESULTS BY MANUALLY OR AUTOMATICALLY EXCLUDING PREVIOUSLY PRESENTED SEARCH RESULTS

(75) Inventors: Michael L. Emens, San Jose, CA (US); Reiner Kraft, Gilroy, CA (US); Peter Chi-Shing Yim, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,844

(22) Filed: Jan. 5, 2000

(51) Int. Cl.[7] ............................................. G06F 17/30
(52) U.S. Cl. .............................. 707/5; 707/3; 707/100; 707/103 R; 707/104.1; 707/200
(58) Field of Search ............................... 707/2, 3, 5, 10, 707/101, 200, 4, 6, 100, 104.1, 203, 103 R

(56) References Cited

U.S. PATENT DOCUMENTS

| | | | | |
|---|---|---|---|---|
| 5,802,518 A | * | 9/1998 | Karaev et al. ................. | 707/10 |
| 5,826,265 A | * | 10/1998 | Van Huben et al. ........... | 707/10 |
| 5,838,965 A | * | 11/1998 | Kavanagh et al. ....... | 707/103 R |
| 5,873,076 A | * | 2/1999 | Barr et al. ................ | 704/270.1 |
| 5,875,446 A | * | 2/1999 | Brown et al. ............. | 345/970.1 |
| 5,913,208 A | * | 6/1999 | Brown et al. ................... | 707/3 |
| 5,987,457 A | * | 11/1999 | Ballard ......................... | 707/10 |
| 6,035,297 A | * | 3/2000 | Van Huben et al. .......... | 707/10 |
| 6,078,914 A | * | 6/2000 | Redfern .......................... | 707/2 |
| 6,078,917 A | * | 6/2000 | Paulsen et al. ................. | 707/5 |
| 6,144,958 A | * | 11/2000 | Ortega et al. ................. | 707/10 |
| 6,249,784 B1 | * | 6/2001 | Macke et al. ................... | 707/3 |
| 6,311,178 B1 | * | 10/2001 | Bi et al. ........................ | 705/37 |
| 6,336,117 B1 | * | 1/2002 | Massarani ................... | 707/100 |
| 6,338,059 B1 | * | 1/2002 | Fields et al. .................. | 707/10 |
| 6,401,118 B1 | * | 6/2002 | Thomas ......................... | 707/4 |

OTHER PUBLICATIONS

Proquest Direct Quick Reference, UMI, ProQuest Direct 2.0, Aug. 1998. pp. 1–6.*

* cited by examiner

*Primary Examiner*—Jean M. Corrielus
*Assistant Examiner*—Shahid Alam
(74) *Attorney, Agent, or Firm*—DeLio & Peterson LLC; Kelly Reynolds; Alison D. Mortinger

(57) ABSTRACT

A method and apparatus which enables a user to streamline the number of results presented to the user during a search session most typically performed over the Internet. The present invention allows the user to select specific results from a search result set which are to be excluded and are not to reappear in a subsequent result set in the search session. The present invention is capable of automatically excluding results from a search result set unless the user specifically flags the specific search results they want to keep and have reappear in a subsequent result set in the search session. This allows a user to save time during a search session by not having to view repeated results, and allows the user to focus on more relevant and related results.

22 Claims, 6 Drawing Sheets

Query: (web)
45773 of 2434558 matched

|◀◀ First ◀ Prev  1-20  Next ▶  Last ▶▶|

Results limited to 500 hits

| Patent | Issued | Title |
|---|---|---|
| US05881647 | 03/16/1999 | Printing press with electrostatic cooling |
| US05879278 | 03/09/1999 | Method and machine for cutting liners and inserting cut liners into closures |
| US05878975 | 03/09/1999 | Winder rider roll assembly |
| US05878320 | 03/02/1999 | Continuous imaging of a continuous web substrate with a single print engine w |
| US05876792 | 03/02/1999 | Methods and apparatus for controlled placement of a polymer composition in |
| US05876531 | 03/02/1999 | Process for making a mechanical fastener having a grip tab |
| US05875715 | 03/02/1999 | Hand-held labeler |
| US05875296 | 02/23/1999 | Distributed file system web server user authentication with cookies |
| US05873635 | 02/23/1999 | Child seat harness clip with web lock |
| US05872915 | 02/16/1999 | Computer apparatus and method for providing security checking for software |
| US05868276 | 02/09/1999 | Folded sheet material web and assembly and method and apparatus therefore |
| US05865955 | 02/02/1999 | Method and device for enhancing the run of a paper web in a paper machine |
| US05865118 | 02/02/1999 | Method and apparatus for punching and imaging a continuous web |
| US05862613 | 01/26/1999 | Paper machine and methods for drying a paper web |

Fig. 1
(PRIOR ART)

Query: (web) and (search engines)

372 of 2434558 matched  |◀ First  ◀ Prev  1-20  Next ▶  Last ▶|

Results limited to 500 hits

| Patent | Issued | Title |
|---|---|---|
| ☐ US05881647 | 03/16/1999 | Printing press with electrostatic cooling |
| ☐ US05884309 | 03/16/1999 | Order entry system for internet |
| ☐ US05802518 | 09/01/1998 | Information delivery system and method |
| ☐ US05878320 | 03/02/1999 | Continuous imaging of a continuous web substrate with a single print engine w |
| ☐ US05864863 | 01/26/1999 | Method for parsing, indexing and searching world-wide-web pages |
| ☐ US05819288 | 10/06/1998 | Statistically based image group descriptor particularly suited for use in an image |
| ☐ US04566654 | 01/28/1986 | Web transport device |
| ☐ US05875296 | 02/23/1999 | Distributed file system web server user authentication with cookies |
| ☐ US05778367 | 07/07/1998 | Automated on-line information service and directory, particularly for |
| ☐ US05557722 | 09/17/1996 | Data processing system and method for representing, generating a |
| ☐ US05868276 | 02/09/1999 | Folded sheet material web and assembly and method and apparatus therefore |
| ☐ US05859972 | 01/12/1999 | Multiple server repository and multiple server remote |
| ☐ US05758324 | 05/26/1998 | Resume storage and retrieval system |
| ☐ US05862613 | 01/26/1999 | Paper machine and methods for drying a paper web |

Fig. 2
(PRIOR ART)

Query: (web) and (search engines)
372 of 2434558 matched |◀◀ First ◀ Prev ▼ 1-20 Next ▲ Last ▶▶|
Results limited to 500 hits

| Check To Remove | Patent | Issued | Title |
|---|---|---|---|
| ☑ | US05881647 | 03/16/1999 | Printing press with electrostatic cooling |
| ☐ | US05884309 | 03/16/1999 | Order entry system for internet |
| ☐ | US05802518 | 09/01/1998 | Information delivery system and method |
| ☑ | US05878320 | 03/02/1999 | Continuous imaging of a continuous web substrate with a single print engine w |
| ☐ | US05864863 | 01/26/1999 | Method for parsing, indexing and searching world-wide-web pages |
| ☐ | US05819288 | 10/06/1998 | Statistically based image group descriptor particularly suited for use in an image |
| ☐ | US04566654 | 01/28/1986 | Web transport device |
| ☑ | US05875296 | 02/23/1999 | Distributed file system web server user authentication with cookies |
| ☐ | US05778367 | 07/07/1998 | Automated on-line information service and directory, particularly for |
| ☐ | US05557722 | 09/17/1996 | Data processing system and method for representing, generating a |
| ☑ | US05868276 | 02/09/1999 | Folded sheet material web and assembly and method and apparatus therefore |
| ☐ | US05859972 | 01/12/1999 | Multiple server repository and multiple server remote |
| ☐ | US05758324 | 05/26/1998 | Resume storage and retrieval system |
| ☑ | US05862613 | 01/26/1999 | Paper machine and methods for drying a paper web |

Fig. 3

METHOD FOR REDUCING SEARCH RESULTS BY MANUALLY OR AUTOMATICALLY EXCLUDING PREVIOUSLY PRESENTED SEARCH RESULTS

BACKGROUND OF THE INVENTION

1. Field of the Invention

The present invention is related to the area of internet search technologies and resource gathering using web crawling techniques, and in particular to a method and apparatus for streamlining the results of an internet search by excluding the results of a prior search.

2. Description of Related Art

Today, people use search engines to perform a search for a specific topic or topics. Typically, it is not uncommon for the set of search results to contain a very large number of search results. Thus, during a search session, a user may perform several searches, each one a refinement of the previous search. This allows the user to scale down the number of results returned to the user during the search session. Even though the search strings are changing, the information that the user is seeking for does not change.

In a typical search, each time a search string is submitted to a search engine and the search results are returned from the search engine, the user reads the result summaries and reviews a specific result, which may include a web page or site, which is close to the topic they are searching. The problem though, is that too often unwanted or previously reviewed results keep reappearing in each subsequent search result set, even after the search is refined. Thus, the search result set continues to be unwieldy, making it difficult to find a specific web page or site containing information specifically relevant or responsive to the user's search query.

Bearing in mind the problems and deficiencies of the prior art, it is therefore an object of the present invention to provide a method and apparatus to reduce redundant search results during an Internet search session.

It is another object of the present invention to provide a method and apparatus to enable a user to select specific search results to be excluded from a set of subsequent search results during an Internet search session.

A further object of the invention is to provide a method and apparatus to allow a user to select specific search results to be included in a set of subsequent search results during an Internet search session.

It is yet another object of the present invention to provide a method and apparatus to automatically exclude redundant search results from a subsequent search result set during an Internet search session.

Still other objects and advantages of the invention will in part be obvious and will in part be apparent from the specification.

SUMMARY OF THE INVENTION

The above and other objects and advantages, which will be apparent to one skilled in the art, are achieved in the present invention which is directed to, in a first aspect, a method for streamlining the results of an Internet search by excluding at least one prior search result from a current set of search results. The method comprises first selecting at least one result from a displayed set of search results. In the preferred embodiment, the result is selected by marking an action box on a screen viewable to the user which is associated with the result. In a first aspect of the preferred embodiment, a mark in the action box indicates that the result will be excluded from a subsequent set of search results in the search session. In a second aspect of the preferred embodiment, a mark in the action box indicates that the selected result is to be included in a subsequent set of search results in the search session.

A second search is conducted using a second search string to generate a second set of search results. In the preferred embodiment, the second search is related to the first search, with the second search string being narrower in scope that the first search string. It is also preferred that the first and second search strings be hypertext transfer protocol search strings.

The second set of search results is then processed, and a new set of search results is generated which displays only those results not selected to be excluded. In the preferred embodiment, the processing step comprises comparing the displayed set of search results with the second set of search results. Any result in the second set not found in the currently displayed set is identified. Those results from the displayed set selected to be included in the second set are also identified, and the new set of displayed search results is formed which comprises only those results which were not previously displayed or which were selected from the prior set to be carried over into the new displayed set. In the preferred embodiment, this process is repeated for a plurality of subsequent search sets within the search session.

In another aspect the present invention is directed to an article of manufacture comprising a computer usable medium having computer readable program code means embodied therein for causing a search result set to be streamlined by excluding at least one prior search result from a current set of search results. The computer readable program code means in the article of manufacture comprises computer readable program code means for causing a computer to select at least one result from a displayed set of search results, conduct at least one second search and generate a second set of search results. The second set of search results is processed to exclude at least one prior search result and to display a new set of search results which comprises results not selected to be excluded. In the preferred embodiment, the second search is related to the first search, and the second search string is narrower than the first search string.

In the preferred embodiment, the computer readable program code means for causing a computer to select at least one result from the displayed set of results comprises computer readable program code means for causing a computer to define an action box associated with each result on a monitor viewable by the user, and computer readable program code means for causing a computer to form a mark in the selected box. In one aspect of the preferred embodiment, the invention further comprises computer readable program code means for causing a computer to exclude the selected result from the new set of search results. In another aspect of the preferred embodiment, the invention further comprises computer readable program code means for causing a computer to compare the displayed set of results with a second subsequent set of results, to identify at least one result in the second set which is not in the displayed set, and to include, in the new set of search results, only the selected results and results not in the displayed set of results.

In a another aspect, the present invention is directed to a computer program product for use with a search device and comprises a computer usable medium having computer readable program code means embodied in the medium for causing a search result set to be streamlined by excluding at least one prior search result from a current set of search results. The computer program product comprises computer readable program code means for causing a computer to select at least one result from the displayed set of search results, to conduct at least one second search and generate a second set of search results, and to cause a computer to process the second set of search results. In the preferred embodiment, the processed set of search results comprises search results not selected to be excluded from the the second set of search results.

In the preferred embodiment, the computer program product further comprises computer readable program code means for causing a computer to generate a displayed set of search results using a first and second search string, where the second search string is narrower in scope than said first search string.

In the preferred embodiment, the computer readable program code means for causing a computer to select at least one result from a displayed set of search results comprises computer readable program code means for causing a computer to define an action box associated with at least one result on a screen viewable by the user, and to form a mark in a selected box. In the preferred embodiment, the present invention further comprises computer readable program code means for causing a computer to exclude the selected result from a new set of search results. In another aspect, the present invention further comprises computer readable program code means for causing a computer to compare the displayed set and second sets of search results, to identify at least one result in the second set of search results not in the displayed set of search results, and to include in the new set of search results, only the selected results and results not already in the displayed set of search results. In the preferred embodiment, the excluded results are stored in a database.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a pictorial representation of a typical set of results for a text search using a web based search engine.

FIG. 2 is pictorial representation of a typical set of search results for the search depicted in FIG. 1.

FIG. 3 is a pictorial representation of a typical search result page of the present invention using a web based search engine.

DESCRIPTION OF THE PREFERRED EMBODIMENT(S)

Figure 4:
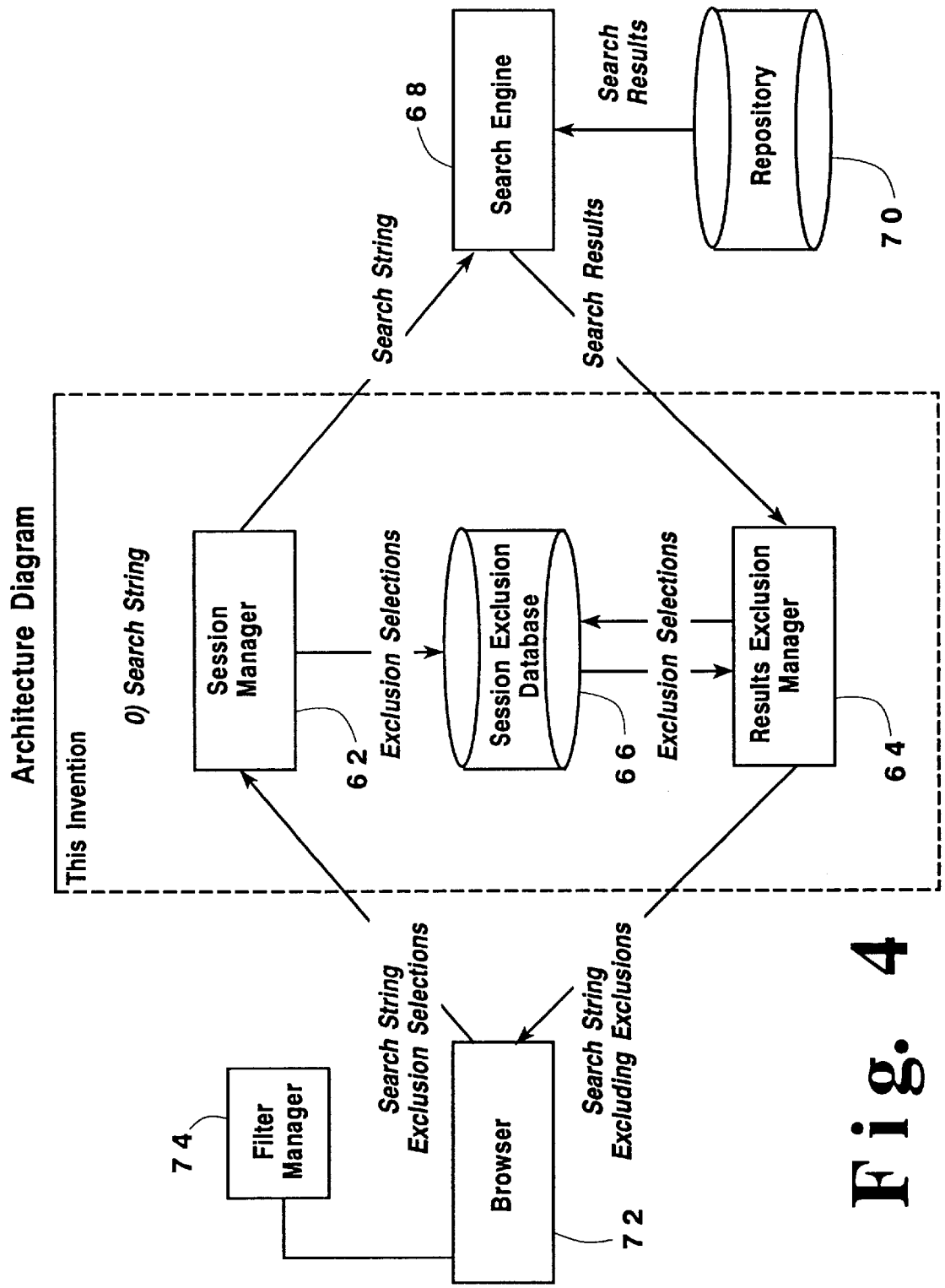
FIG. 4 is a schematic representation of the typical components of the present invention.

In describing the preferred embodiment of the present invention, reference will be made herein to FIGS. 1–6 of the drawings, in which like numerals refer to like features of the invention. Features of the invention are not necessarily shown to scale in the drawings.

The present invention enables a user to limit or reduce the number of returned results during an information search session. The search or query sessions as described herein, may be typically conducted on the Internet using a web based search engine, but as will be apparent to one skilled in the art, may be conducted on any computerized database and information system. Accordingly, the present invention may be implemented on any such system, including the Internet or world wide web. In a first aspect, the present invention provides a method and apparatus to enable a user to reduce the number of redundant results which reappear in subsequent search results sets during a query session. A query session as described herein includes an initial search as well as any, subsequent, refined searches. A query session may continue until the user has identified an adequate amount of relevant search results. The present invention provides a method and apparatus that allows a user to select certain results in a search result set that are to be excluded from the result set of a subsequent search. In another aspect, the present invention provides a method and apparatus to automatically exclude results from a search result set unless the user identifies or flags specific search results they want to keep. This allows a user to save time during a search by not having to view repeated results and allows the display of a more responsive and relevant set of results.

For example, using the "IBM WEB BASED PATENT DATABASE" a search of the patent database is conducted using the search term "web." The query "web" is submitted to the search engine and a set of search results are returned as shown in FIG. 1. Typically, the search results can be presented to be viewed by the user on a computer screen or monitor. As shown in FIG. 1, the result set 20 is viewed as a page on a monitor screen. In this example, a total of 45,773 hits are returned, as indicated by reference 12, in the set of search results 20. In order to refine the search to yield fewer hits, the search is narrowed and the query containing the search criteria "web" and "search engines" is submitted to the search engine, as shown in FIG. 2. For this narrower search, the search result set 30 contains 372 hits, as indicated by reference 16. However, a number of the "hits" or search results, for example results 22, 24, 26 and 28, were already seen in the prior search result set. The repetitive inclusion of this information in the search result set adds to the already large amount of information and data to be reviewed. With the present invention, the user can now selectively exclude these repetitive results from the prior search and view a result set containing only new results, or view only specific old results and any new, non-repetitive results.

As shown in FIG. 3, the present invention provides an action or check box 50 adjacent to, or associated with, each search result in the search result set 30. Action box 50 can be used to select, or identify those results the users wishes to exclude or include in a subsequent result sets. A mark 60, such as a checkmark, can been caused to be placed in each box 50 of a selected result. For example, results 22, 24, 26 and 28 were previously returned in the search results set 20 for "web" in FIG. 1. Results 22, 24, 26 and 28 again appear in the search result set 30 for "web" and "search engines" in FIG. 2. As shown in FIG. 3, by placing a mark 60 in boxes 52, 54, 56 and 58, which are associated with results 22, 24, 26 and 28, these results can now be selected and excluded from subsequent search result sets. This way, the new search set does not include these prior results, and the user is able to work with a much more refined set of search results.

In another aspect of the present invention, by selecting box 50, the user is able to select results from a search which the user desires to carry over into a subsequent set of search results. Any result not selected, which then re-appears in a subsequent set of search results, is automatically excluded from the subsequent set of search results and is not displayed. Thus, if the user desired to carry over results 22, 24, 26 and 28 into a subsequent search result set, the user would place a mark 60 in boxes 52, 54, 56 and 58. Then, in a subsequent search, only those results appearing for the first time, along with results 22, 24, 26 and 28 would be displayed.

As shown in FIG. 4, a typical architecture that may be used to practice the present invention comprises a session manager 62, a results exclusion manager 64, and a session exclusion database 66. The typical architecture may also include a search engine 68, a browser 72, a filter manager 74 and a repository 70, each of which is well known in the art. Session manager 62 receives a search query string, typically submitted by a user, formatted as a hypertext transfer protocol. Session manager 62 is adapted to determine if the user has started a search session, and if not, to start a new search or query session. Typically, this may involve the creation of a user and session identification. The search string is then passed to the search engine 68 which will initiate the search. The results of the search are returned to the results exclusion manager 64. Results exclusion manager 64 is adapted to analyze the result set and, in a first aspect, remove or exclude search results the user has identified to be excluded. In another aspect, result exclusion manager 64 may be adapted to include any selected or marked results and all new non-repeated results, and exclude all other results. This way, only new results and prior results the user wishes to keep, are presented or displayed to the user. This can result in a streamlined or reduced search result list. Result exclusion manager 64 may also be adapted to form an action box associated with each search result in the result list which the user can then select or mark to indicate whether specific results should be excluded or included in future results sets within the session. Session exclusion database 66 can be used to store the selected excluded or included search items during a query session. For example, during a session, a user might select certain search result items from a data set for exclusion from a subsequent data set. The present invention can keep track of these excluded search items by temporarily storing the information in the session exclusion database 66. When the new set of search results are retrieved, result exclusion manager 64 can access the information stored in the session exclusion database 66, and determine which of the results in a new set of search results are to be excluded or included in the new set. When the session is terminated, the stored information, or data, can be erased. Typically, the stored data in the session exclusion database 66 will include the session identification and a set of unique identifiers such as URL's of the stored search result items.

Figure 5:
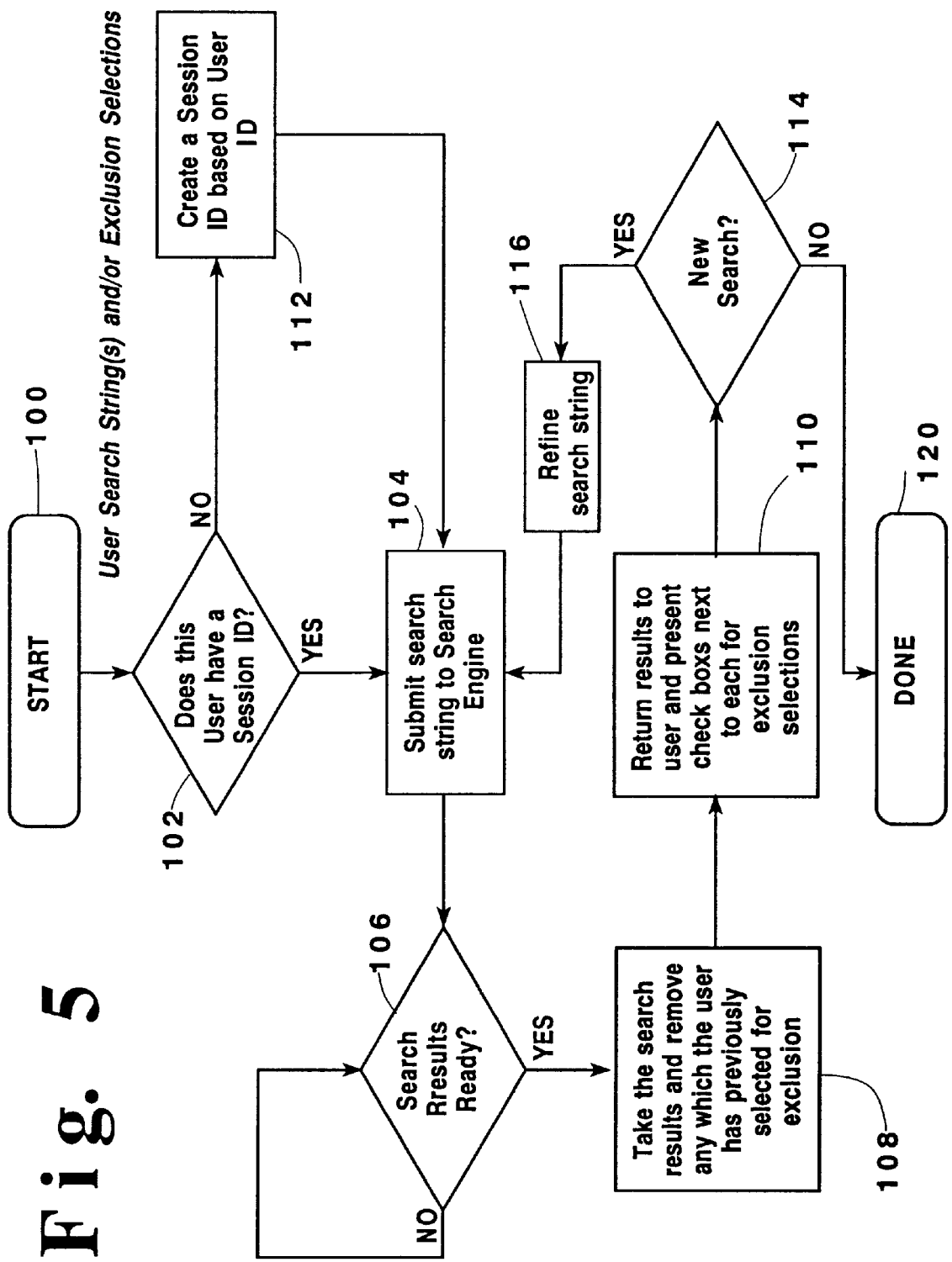
FIG. 5 is a flow chart of the typical process of the present invention.

The typical process of the present invention is depicted in FIG. 5. The process may require a user to have a session identification 102, and if the user does not, a session ID may be created for the user 112. Typically, a search query string is submitted to a search engine 104 and the user waits for results 106. The search query string may be a hypertext transfer protocol ("HTTP"). Once the results are received, those results that were selected to be excluded are deleted from the returned set of search results 108. This may involve identifying selected results and comparing each to the new set of search results and excluding any matches. In another aspect, the exclusion process may comprise comparing the new search results to the prior set of search results, and excluding all results which previously appeared and have not been selected to be displayed in the results of the new search. The final set of streamlined search results is then displayed to the user, with action or check boxes 50 next to each displayed result 110. The user may then select those results to be excluded or included in another search, and initiate a new search 114, with a refined search string 116. Any prior result which is excluded will not reappear in a subsequent refinement of the search criteria. This process may continue until the user is satisfied with the displayed set of search results. Alternatively, the user may end the search session 120.

Figure 6:
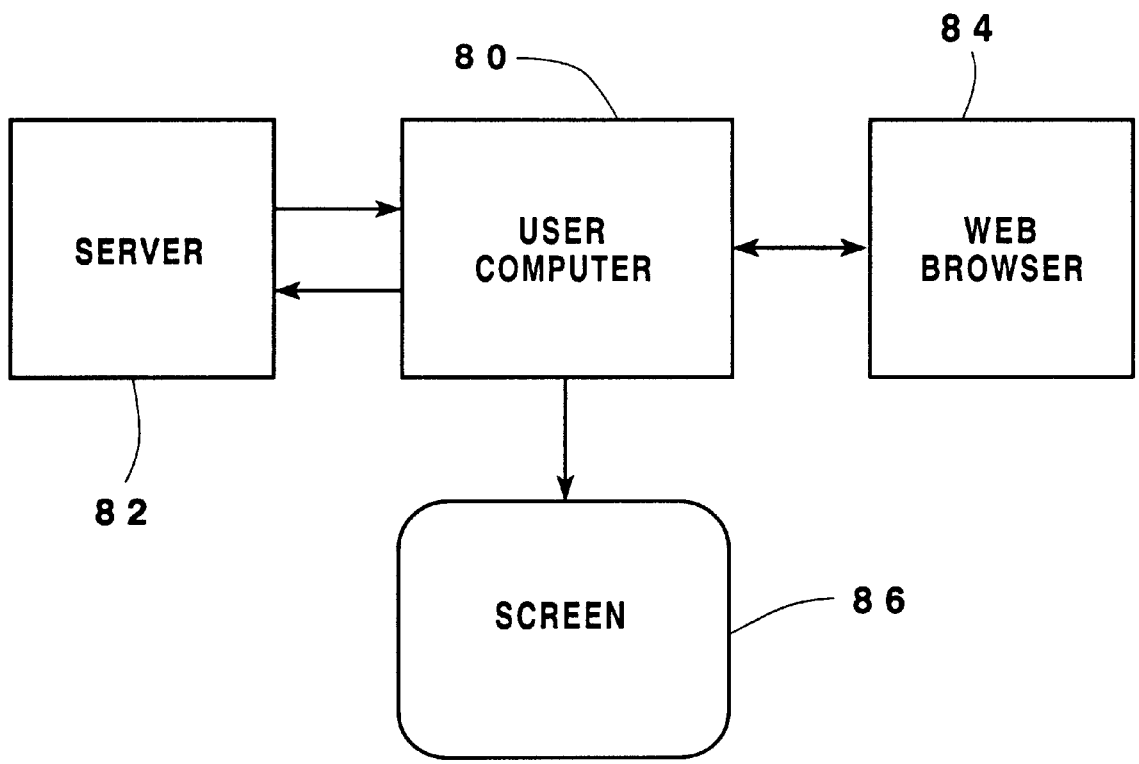
FIG. 6 is a schematic representation of a typical apparatus which may be used to practice the present invention.

FIG. 6 is a schematic representation of a typical apparatus which may be used to practice the present invention. Computer system 80 may be linked to a server computer 82 and a web browser 84 such that the computers are capable of sending information to and from each computer. Information is made available to both computer systems using a communication protocol sent over a communication channel such as the Internet or through a dial-up connection, e.g., ISDN line. Computer 80 is capable of utilizing program storage devices embodying machine readable program source code which causes the computers to perform the method steps of the present invention. The program storage devices of the present invention may be devised, made and used as a component of a machine utilizing optics, magnetic properties and/or electronics to perform the method steps of the present invention. Program storage devices include, but are not limited to, magnetic diskettes, magnetic tapes, optical disks, Read Only Memory (ROM), floppy disks, semiconductor chips and the like. Computer 80 is linked by telephone or other conventional communication interface to the world wide web. Computer systems 80 and 82 have a microprocessor for executing stored programs and computer system 80 includes a data storage device on its program storage device for storage of information and data. The computer program or software incorporating the method steps and instructions described may be stored in both computer(s) and network server on an otherwise conventional program storage device. Program storage device may include such devices as a semiconductor chip, a read-only memory, or magnetic media such as a diskette or computer hard drive, which is readable and executable by a computer (s). A screen 86 is able to display the desired results accessed from the computer 80.

The present invention thus streamlines search result sets by eliminating redundant results from the search set unless the result is specifically selected to reappear in subsequent result sets. By providing an action box associated with each result in the result set, the user can select a result to either include or exclude from a subsequent result set, and the exclusion process can be either automatic or manual.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for streamlining the results of an Internet search by excluding at least one prior search result from a current set of search results, the method comprising the steps of:

conducting a first search;

displaying a first set of search results from said first search;

excluding at least one result of said displayed first set of search results from at least one second search by a user selecting said at least one result; conducting said at least one second search, said second search generating a second set of search results comprising at least another search result from said first set of search results not selected to be excluded, said second search related to said first search; and:

displaying said second set of search results comprising said at least another search result from said first set of search results not selected to be excluded thereby enabling said user to eliminate redundant results from said second set of search results unless the result is specifically selected to reappear in subsequent result sets.

2. The method of claim 1 further comprising repeating, for a plurality of first and second sets of search results, the steps of:

excluding at least one result from said displayed first set of search results from at least one second search by a user selecting said at least one result;

conducting at least one second search, said second search generating a second set of search results, said second search related to a first search; and displaying a new second of search results comprising said at least one search result from said first set of search results not selected to be excluded.

3. The method claim 1 wherein said second search is narrower in scope than said first search.

4. The method of claim 3 wherein said first set of search results is generated using a first search string and said second set of search results is generated using a second search string, said second search string being narrower in scope than said first search string.

5. The method of claim 4 wherein said first and second search strings are hypertext transfer protocol search strings.

6. The method of claim 1 wherein said excluding at least one result of said displayed first set of search results comprises the steps of:

presenting said displayed first set of search results on a screen viewable by the user;

defining an action box associated with said at least one result on said screen, said action box being viewable by said user and adapted to indicate whether said at least one result has been selected;

forming a mark in said action box to select said at least one result from said first set of search results thereby indicating that said selected at least one result is to be excluded.

7. An article of manufacture comprising:

a computer usable medium having computer readable program code means embodied therein for causing a search result set to be streamlined by excluding at least one prior search result from a current set of search results, the computer readable program code means in said article of manufacture comprising:

computer readable program code means for causing a computer to exclude at least one result of a displayed first set of search results of a first search from at least one second search by allowing a user to select said at least one result;

computer readable program code means for causing a computer to conduct said at least one second search, said second search generating a second set of search results comprising at least another search result from said first set of search results not selected to be excluded, said second search related to said first search;

computer readable program code means for causing a computer to display said second set of search results comprising said at least another search result from said first set of search results not selected to be excluded thereby enabling said user to eliminate redundant results from said second set of search results unless the result is specifically selected to reappear in subsequent result sets.

8. The article of claim 7 further comprising computer readable program code means for causing a computer to generate said displayed set of search results using a first search string and said second set of search results using a second search string, wherein said second search string is narrower in scope than said first search string.

9. The article of claim 7 wherein said computer readable program code means for causing a computer to allow a user to select at least one result from a displayed first set of search results:

computer readable program code means for causing a computer to define an action box associated with said at least one result on a screen viewable by said user, said action box being adapted to indicate whether said at least one result has been selected;

computer readable program code means for causing a computer to form a mark in an action box selected by said user to indicate that said at least one result has been selected.

10. The article of claim 9 further comprising computer readable program code means for causing a computer to exclude said at least one selected result from said second set of search results.

11. The article of claim 9 further comprising:

computer readable program code means for causing a computer to compare said displayed first set and second sets of search results;

computer readable program code means for causing a computer to identify at least one result in said second set of search results not in said displayed first set of search results;

computer readable program code means for causing a computer to identify said at least one selected result to be included in said second set of search results; and computer readable program code means for causing a computer to include in a new set of search results only said at least one selected result and said at least one result not in said displayed set of search results.

12. A computer program product for use with a search device, said computer program product comprising:

a computer usable medium having computer readable program code means embodied in said medium for causing a search result set to be streamlined by excluding at least one prior search result from a current set of search results, said computer program product having:

computer readable program code means for causing a computer to exclude at least one result of a displayed first set of search results of a first search from at least one second search by allowing a user to select said at least one result;

computer readable program code means for causing a computer to conduct said at least one second search, said second search generating a second set of search results comprising at least another search result from said first set of search results not selected to be excluded, said second search related to said first search;

computer readable program code means for causing a computer to display said second set of search results thereby enabling said user to eliminate redundant results from said second set of search results unless the result is specifically selected to reappear in subsequent result sets.

13. The computer program product of claim 12 further comprising computer readable program code means for causing a computer to generate said displayed set of search results using a first search string and said second set of search results using a second search string, wherein said second search string is narrower in scope than said first search string.

14. The computer program product of claim 12 wherein said computer readable program code means for causing a computer to allow a user to select at least one result from a displayed first set of search results comprises:
   computer readable program code means for causing a computer to define an action box associated with said at least one result, said action box being adapted to indicate whether said at least one result has been selected;
   computer readable program code means for causing a computer to mark an action box selected by said user to indicate that said at least one result has been selected.

15. The computer program product of claim 14 further comprising computer readable program code means for causing a computer to exclude said at least one selected result from said second set of search results.

16. The computer program product of claim 15 further comprising computer programmable code means for storing said at least one excluded result.

17. The computer program product of claim 14 further comprising:
   computer readable program code means for causing a computer to compare said displayed first set and second sets of search results;
   computer readable program code means for causing a computer to identify at least one result in said second set of search results not in said displayed first set of search results;
   computer readable program code means for causing a computer to identify said at least one selected result to be included in said second set of search results; and
   computer readable program code means for causing a computer to include in a new set of search results only said at least one selected result and said at least one result not in said displayed set of search results.

18. A method for streamlining the results of an Internet search by excluding at least one prior search result from a current set of search results, the method comprising the steps of:
   conducting a first search;
   displaying a first set of search results from said first search;
   including at least one result of said displayed first set of search results in at least one second search by a user selecting said at least one result;
   conducting said at least one second search, said second search generating a second set of search results comprising at least said included at least one result of said first set of search results, said second search related to said first search; and
   displaying said second set of search results thereby enabling said user to view said included at least one result of said first set of search results and any new, non-repetitive result sets.

19. The method of claim 18 further comprising repeating, for a plurality of first and second sets of search results, the steps of:
   including at least one result of said displayed first set of search results in at least one second search by a user selecting said at least one result;
   conducting said at least one second search, said second search generating a second set of search results comprising at least said included at least one result of said first set of search results, said second search related to said first search; and
   displaying said second set of search results thereby enabling said user to view said included at least one result of said first set of search results and any new, non-repetitive result sets.

20. The method of claim 18 wherein said first set of search results is generated using a first search string and said second set of search results is generated using a second search string, said second search string being narrower in scope than said first search string.

21. The method of claim 18 wherein said including at least one result of said displayed first set of search results in said second set of search results comprises the steps of:
   presenting said displayed first set of search results on a screen viewable by the user;
   defining an action box associated with said at least one result on said screen, said action box being viewable by said user and adapted to indicate whether said at least one result has been selected;
   forming a mark in said action box to select said at least one result from said first set of search results.

22. The method of claim 21 wherein said processing step comprises the steps of:
   comparing said displayed first set of search results with said second set of search results;
   identifying at least one result in said second set of search results not in said first set of search results; and
   identifying said at least one selected result to be included in said second set of search results;
   displaying in a new set of search results only said at least one search results not in said first set of search results and said at least one selected result.

* * * * *